(12) United States Patent
Liu et al.

(10) Patent No.: US 6,542,153 B1
(45) Date of Patent: Apr. 1, 2003

(54) METHOD AND SYSTEM FOR THREE-DIMENSIONAL VOLUME EDITING FOR MEDICAL IMAGING APPLICATIONS

(75) Inventors: Dong-Chyuan Liu, Mercer Island, WA (US); Thomas B. Lindh, Woodinwill, WA (US); Christian Deforge, Seattle, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 177 days.

(21) Appl. No.: 09/671,763

(22) Filed: Sep. 27, 2000

(51) Int. Cl.⁷ .............................................. G06T 17/00
(52) U.S. Cl. ...................................................... 345/424
(58) Field of Search .............................. 345/418, 419, 345/423, 424, 426, 427

(56) References Cited

U.S. PATENT DOCUMENTS 5,877,779 A * 3/1999 Goldbdrg et al. ........... 345/419
6,366,800 B1 * 4/2002 Vining et al. ............... 128/920

* cited by examiner

Primary Examiner—Cliff N. Vo (57) ABSTRACT

A system and a method for three dimensional (3D) volume editing for medical imaging applications is disclosed. The method and system comprise the steps of projecting vertices of the at least one ROI in one plane and transforming the data within the at least one ROI to allow all of a plurality of slices on the inside of the at least one ROI to be along one axis of a three axis coordinate system. The method and system also includes representing the inside of the at least one ROI as a plurality of line segments, wherein only two coordinates and the length of a line segment are stored. The system and method is particularly useful for removing unwanted structure by defining one or more regions of interest (ROI) in freehand from an arbitrary slice of a 3D data volume. In a preferred embodiment, the system and method comprises a fast algorithm to process a set of compact ROI volumes to remove either the inside or the outside ROI volumes. Because the computational complexity is linear to the boundary of the ROI, the system and method can allow 3D volume editing to be faster and more user interactive.

30 Claims, 9 Drawing Sheets

- $z_1 < z < z_2$:
  Outside: $xl_w + ym_w + zn_w - p_1 < 0$

- $z_3 < z < z_4$:
  Outside: $xl_w + ym_w + zn_w - p_2 > 0$

METHOD AND SYSTEM FOR THREE-DIMENSIONAL VOLUME EDITING FOR MEDICAL IMAGING APPLICATIONS

FIELD OF THE INVENTION

The present invention relates to medical imaging applications and more particularly to a tool for editing three-dimensional volumes in such applications.

BACKGROUND OF THE INVENTION

Three-dimensional (3D) volume editing is performed in medical imaging applications to provide for an unobstructed view of an object of interest, such as a fetus face. For example the view of the fetus face may be obstructed by the presence of the umbilical cord in front of the fetal head. Accordingly, the obstructing cord should be removed via editing techniques to provide an unobstructed image of the face. Existing commercial software packages perform the clipping either from one of three orthogonal two-dimensional (2D) image slices or directly from the rendered 3D image.

The editing from image slices is based on drawing a region of interest (ROI) in one slice and automatically duplicating this ROI through other slices. This is preferably implemented by locating a whole slice with arbitrary angles and moving the slice all the way to the outside of the 3D volume to remove all voxels within the moving distance. In the conventional editing technique, one can define arbitrarily shaped boundaries on a 2D slice and back-project pixelwise into the 3D data space forming an axis-aligned (i.e., along the normal vector of the slice) solid. The bits of all visual voxels within the solid are set to false (i.e., set to zero to remove the inside of the ROI volume).

These standard approaches are time consuming because all voxels along the normal vector of the slice have to be calculated within the ROI. If a square is considered as the ROI with N boundary points, this approach needs ($N^2/16$) computations. Moreover, setting the voxels to false within this ROI solid is also time consuming because the neighborhood voxels in this ROI solid could be scattered on different 2D image planes), and therefore the memory access to the ROI cannot be performed in an organized fashion.

Accordingly, what is needed is a system and method for overcoming the above-identified problem. The present invention addresses such a need.

SUMMARY OF THE INVENTION

The present invention relates in general to a system and a method for three dimensional (3D) volume editing for medical imaging applications. The method and system comprise the steps of projecting vertices of the at least one ROI in one plane and transforming the data within the at least one ROI to allow all of a plurality of slices on the inside of the at least one ROI to be along one axis of a three axis coordinate system. The method and system also includes representing the inside of the at least one ROI as a plurality of line segments, wherein only two coordinates and the length of a line segment are stored.

A system and method in accordance with the present invention is particularly useful for removing unwanted structure by defining one or more regions of interest (ROI) in freehand from an arbitrary slice of a 3D data volume. In a preferred embodiment, a system and method in accordance with the present invention comprises a fast algorithm to process a set of compact ROI volumes to remove either the inside or the outside ROI volumes. Because the computational complexity is linear to the boundary of the ROI, a system and method in accordance with the present invention can allow 3D volume editing to be faster and more user interactive.

In addition, in an improvement, the edits could be undone in a limitless and straightforward manner (unlimited undo) by simply storing in memory the original volume (i.e., unedited dataset) and a compact link list structure of the edits which have been performed.

DETAILED DESCRIPTION

The present invention relates to medical imaging applications and more particularly to a tool for editing three-dimensional volumes in such applications. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
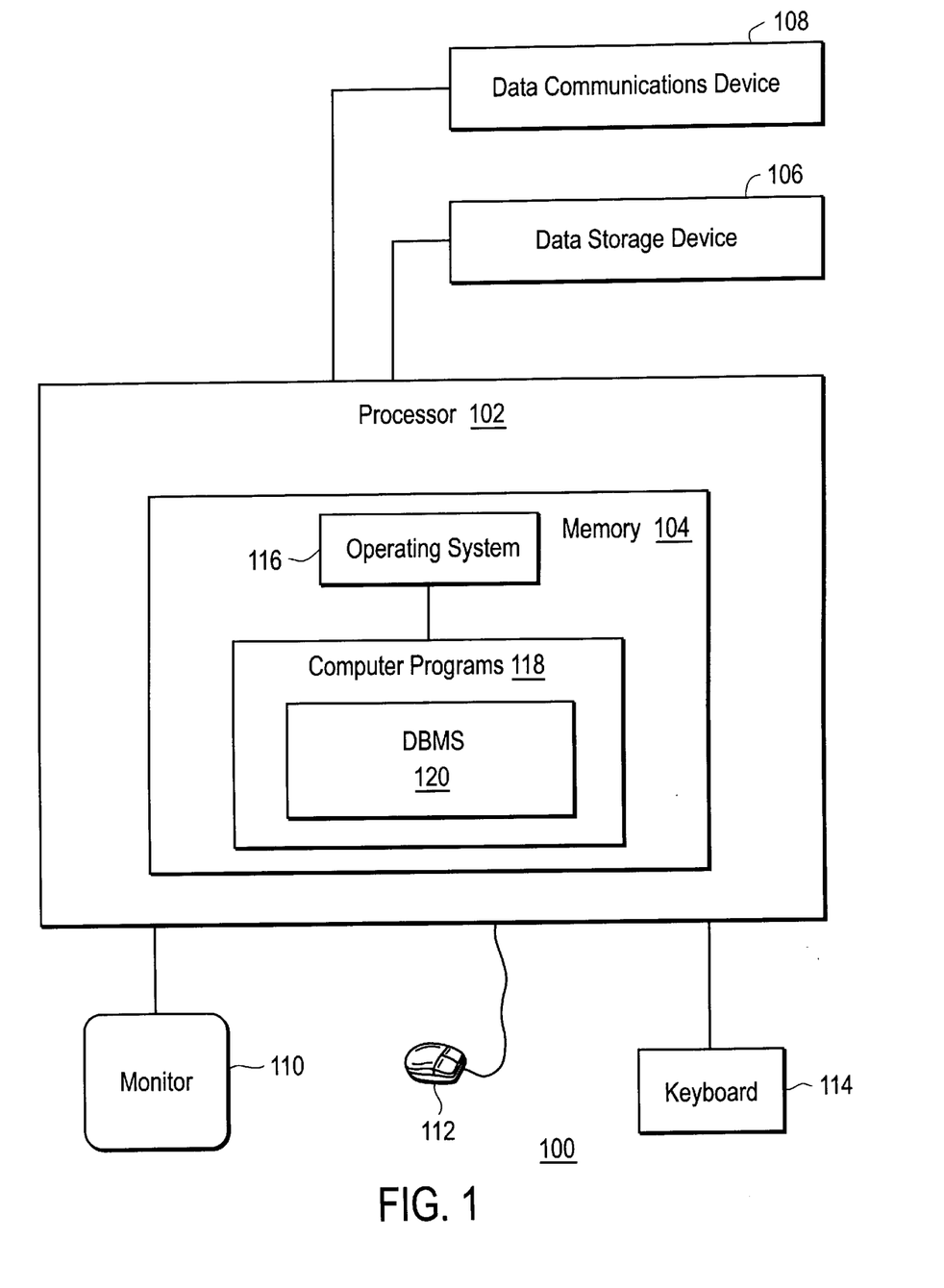
FIG. 1 illustrates a hardware environment used to implement the present invention.

Accordingly, FIG. 1 illustrates a hardware environment used to implement the present invention. As illustrated in FIG. 1, in the preferred embodiment the present invention is implemented in a server computer ("server") 100. The server 100 generally includes, a processor 102, a memory 104 such as a random access memory (RAM), a data storage device 106 (e.g., hard drive, floppy disk drive, CD-ROM disk drive, etc.), a is data communication device 108 (e.g., modem, network interface device, etc.), a monitor 110 (e.g., CRT, LCD display, etc.), a pointing device 112 (e.g., a mouse, a track ball, a pad or any other device responsive to touch, etc.) and a keyboard 114. It is envisioned that attached to the computer 100 may be other devices such as read only memory (ROM), a video card drive, printers, peripheral devices including local and wide area network interface devices, etc. One of ordinary skill in the art will recognize that any combination of the above system components may be used to configure the server 100.

The server 100 operates under the control of an operating system ("OS") 116, such as MVS™, AIX™, UNIX™, OS/2™, WINDOWS™, WINDOWS NT™, etc., which typically, is loaded into the memory 104 during the server 100 start-up (boot-up) sequence after power-on or reset. In operation, the OS 116 controls the execution by the server 100 of computer programs 118, including server and/or client-server programs. Alternatively, a system and method in accordance with the present invention may be implemented with any one or all of the computer programs 118 embedded in the OS 116 itself without departing from the scope of the invention. Preferably, however, the client programs are separate from the server programs and may not be resident on the server.

The OS 116 and the computer programs 118 each comprise computer readable instructions which, in general, are tangibly embodied in or are readable from a media such as the memory 104, the data storage device 106 and/or the data communications device 108. When executed by the server 100, the instructions cause the server 100 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 100 is typically used as a part of an information search and retrieval system capable of receiving, retrieving and/or dissemination information over the Internet, or any other network environment. One of ordinary skill in the art will recognize that this system may include more than one of server 100.

In the information search and retrieval system, such as a digital library system, a client program communicates with the server 100 by, inter alia, issuing to the server search requests and queries. The server 100 then responds by providing the requested information. The digital library system is typically implemented using a database management system software (DBMS) 120 such as the DB2™ by IBM Corporation. The DBMS 120 receives and responds to search and retrieval requests and termed queries from the client. In the preferred embodiment, the DBMS 120 is server-resident.

Objects are typically stored in a relational database connected to an object server, and the information about the objects is stored in a relational database connected to a library server, wherein the server program(s) operate in conjunction with the (DBMS) 120 to first store the objects and then to retrieve the objects. One of ordinary skill in the art will recognize that the foregoing is an exemplary configuration of a system which embodies the present invention, and that other system configurations such as an ultrasound machine coupled to a workstation via network to access the data in the ultrasound machine may be used without departing from the scope and spirit of the present invention.

Figure 2:
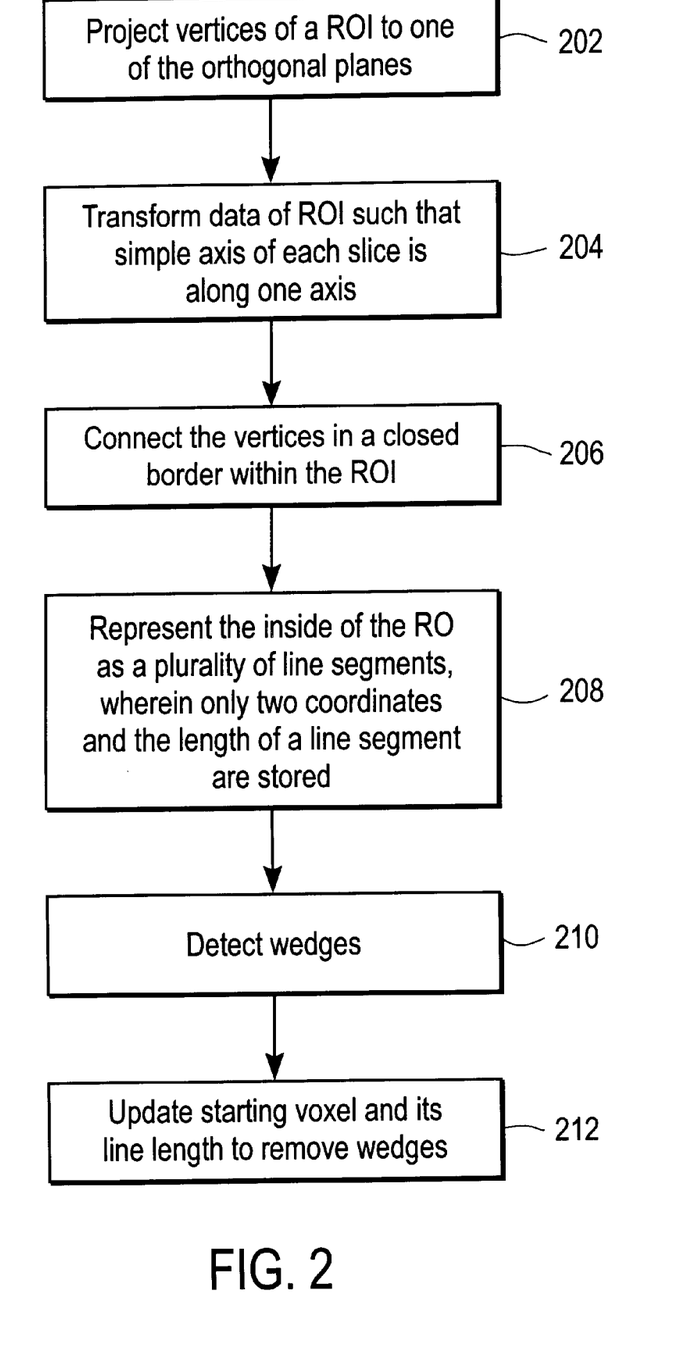
FIG. 2 illustrates a simple flow chart of a system and method in accordance with the present invention.

In the present invention an algorithm is utilized to more quickly obtain the appropriate image by removing unwanted structures. FIG. 2 illustrates a simple flow chart of a system and method in accordance with the present invention. First, instead of computing the region of interest (ROI) a solid along the normal direction of a ROI slice, initial polygon vertices are projected to one of the orthogonal 2D planes to provide a projected two-dimensional (2D) image, via step 202. Thereafter, data of the ROI or volume data is transformed such that the principal axis of the slice is always along the one axis, in this case the Z-axis, to simplify the computation, via step 204. In so doing, the problem of unorganized memory access is resolved because the new ROI solid is along one axis other than an arbitrary direction.

On the projected 2D image, the polygon vertices are then connected to a closed border and the inside of the ROI, via step 206. A new data structure is represented such that the inside of ROI is represented by a set of line segments where only the (x,y) coordinates of the starting pixel of the line segment and the length of the line segment are stored. This approach reduces the number of computations from order $(O)(N^2/16)$ to order $(O)(N/4)$ because only the starting pixel of each line segment (the length is fixed) needs to be translated from image plane to image plane. Accordingly, this allows for one dimensional (1D) processing rather than 2D processing by using a fixed amount of line segment shifting. This substantially reduces the amount of computing power required.

In addition, since the signal processing is along one axis, the boundary conditions can be determined if the ROI solid is bounded by a rectangular box with the same orientation as the ROI slice to detect unwanted wedges. An algorithm is utilized to detect a wedge by determining the two slices at the ends via step 210, and the depth range of the wedge and a simple calculation is then utilized to update the starting pixel of the line segment and its length to remove the wedge, via step 212.

To describe the features of the present invention in more detail, refer now to the following description in conjunction with the accompanying Figures.

Figure 3:
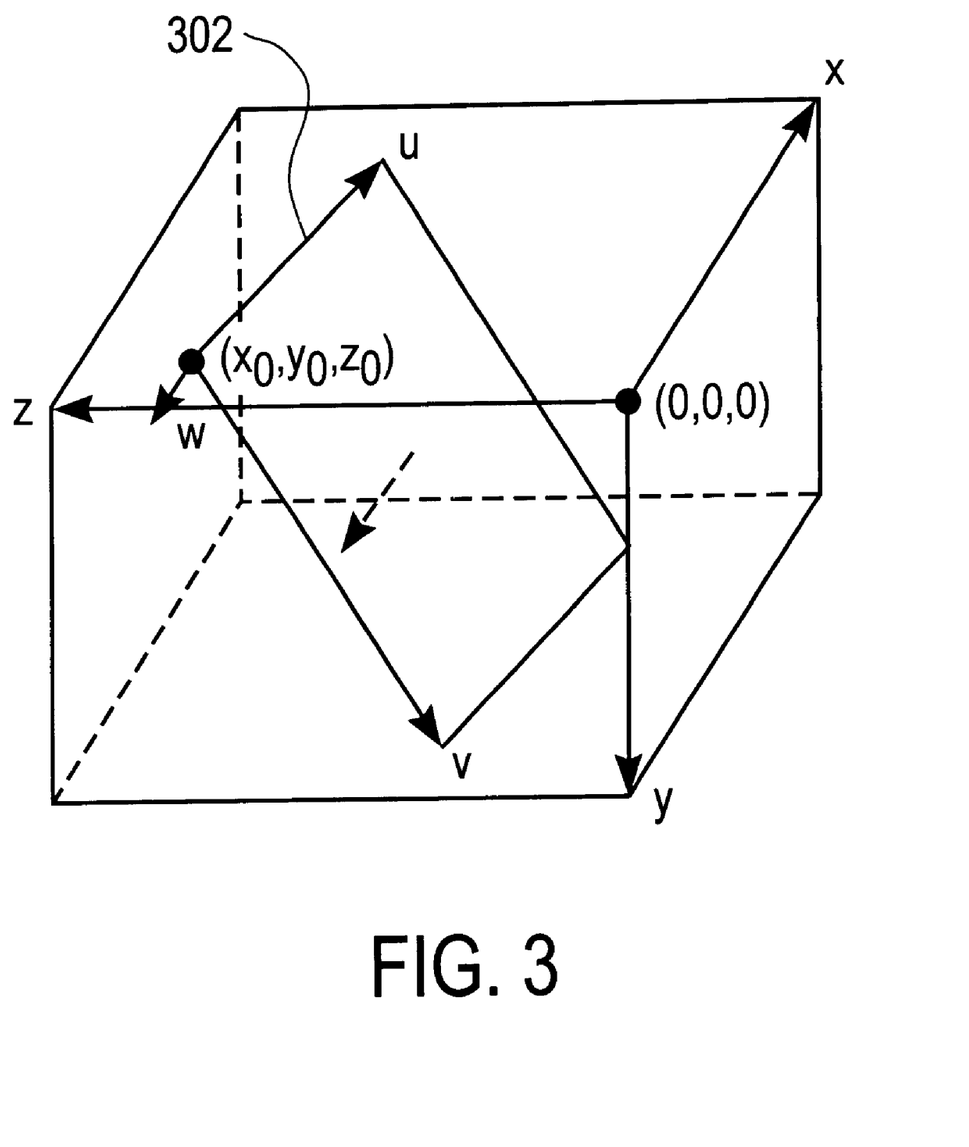
FIG. 3 illustrates the coordinate system (x, y, z) of the normal volume data and the slice space of (u, v, w).

FIG. 3 illustrates the coordinate system (x,y,z) of the normal volume data and the slice space of (u,v,w). As above mentioned, ROI voxels are transformed from the initial (u,v) plane to (x, y, z) space and new voxels are generated from the ROI voxels on the next slice along the normal vector of the (u, v) plane, in accordance with the following equation.

$$\begin{pmatrix} x \\ y \\ z \end{pmatrix} = \begin{pmatrix} l_u & l_v & l_w \\ m_u & m_v & m_w \\ n_u & n_v & n_w \end{pmatrix} \begin{pmatrix} u \\ v \\ w \end{pmatrix} + \begin{pmatrix} x_0 \\ y_0 \\ z_0 \end{pmatrix} \quad \text{(Equation 1)}$$

The new point $(x_k+1, y_k+1, z_K+1)$ corresponding to the slice k+1 will be derived by $$x_k+1=x_k+dl_w, y_k+1=y_k+dm_w, z_k+1=z_k-dn_w \quad \text{(Equation 2)}$$

where d represents the distance between slice k and the slice k+1.

Figure 4:
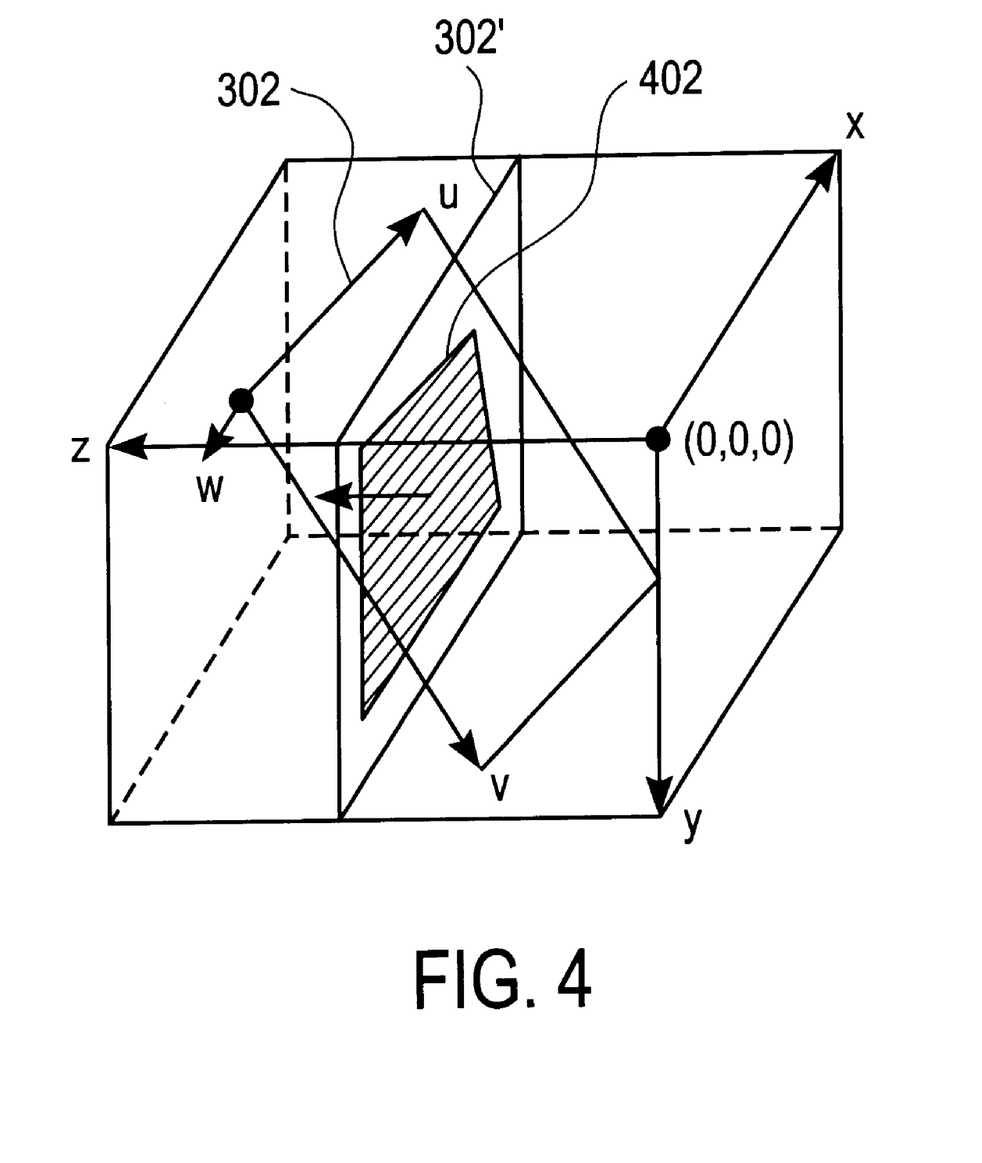
FIG. 4 illustrates the projected ROI after transportation.

FIG. 4 illustrates the projected ROI after transposition of the volume data to a z propagation axis as illustrated by 302'. The volume data is then transposed to have a Z propagation axis and then the above-identified (Equation 2) is applied to the x and y coordinates to find the intersection between the ROI volume and the plane of $z=z_c$.

$$x=x_p+d_p l_w, y=y_p+d_p m_w \quad \text{(Equation 3)}$$

and $d_p=(z_c-z_p)/n_w$, where $(x_p, y_p, z_p)$ is the (x, y, z) coordinates of a derived ROI pixel.

It is clear that, from the above-identified equations (2) and (3), the new projected ROI voxels on z=z' will be $$x'=x+\Delta z\, l_w/n_w, y'=y+\Delta z\, m_w/n_w \quad \text{(Equation 4)}$$

where $\Delta z=z'-z$ is the depth difference between the base frame and the new projection frame.

From Equation (4), the new ROI voxels on the next plane are just the translation of the voxels on the previous plane.

In a preferred embodiment, the ROI voxels (i.e., the voxels to be removed from the raw volume data) are arranged in a data structure so that they can be accessed in an organized way, for example, frame by frame with packed data.

Figure 5:
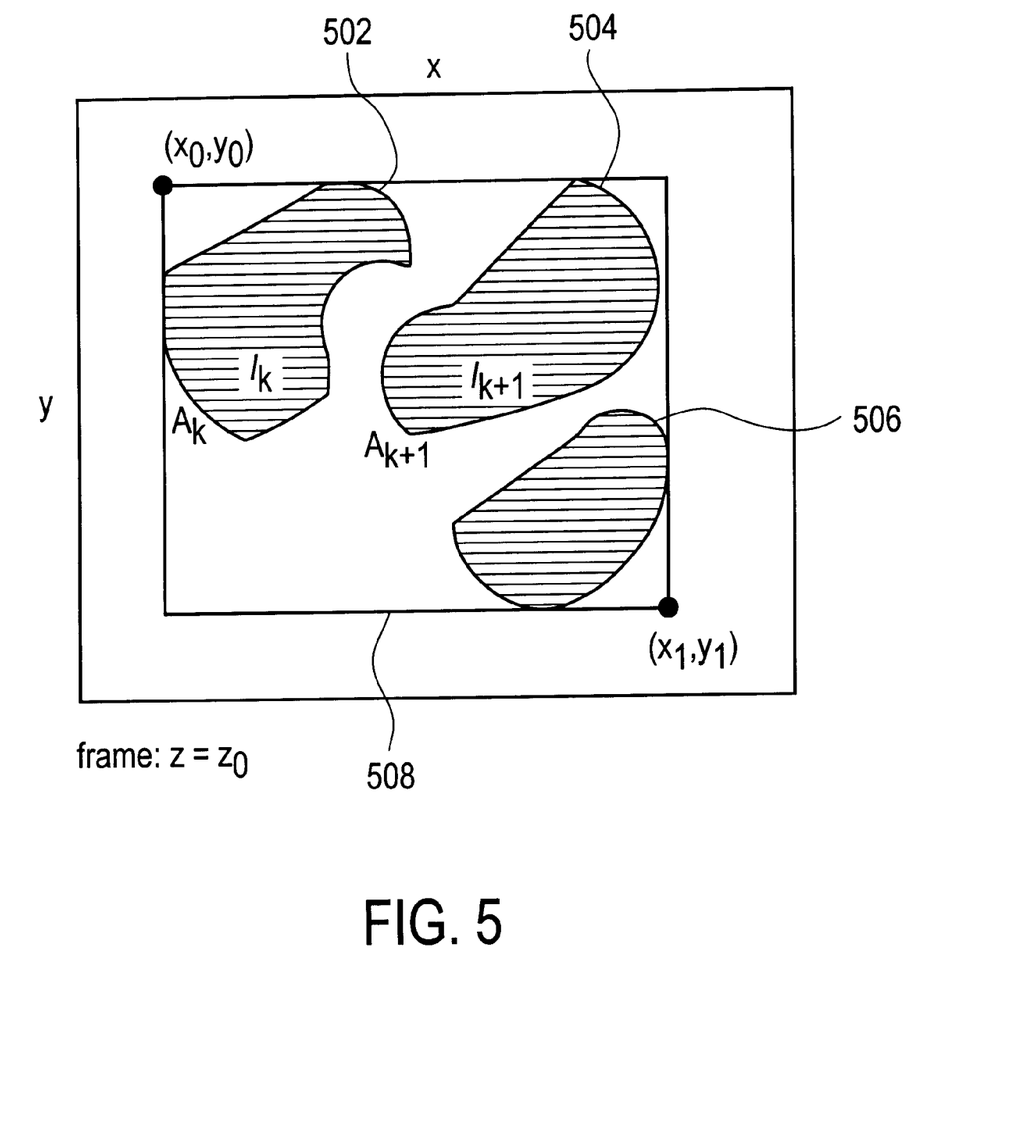
FIG. 5 illustrates a plurality of regions of interest and their data structure on the normal (x, y) plane.

FIG. 5 illustrates a plurality of regions of interest 502–506 and their data structure 508 on the normal (x, y) plane. Data structure is utilized to define the appropriate ROI along one direction as a collection of line segments. As an example, a C data structure, Frame_Volume, defines the projected ROI on the (x,y) plane along the z-direction as a collection of line segments, for example, the line $l_k$ of FIG. 5 has a starting address of $A_k$ with a length defined by the structure of point_length. Therefore the Frame_Volume data structure is defined in the following manner: struct Frame_Volume{ int coord[4];/*left-top and right-bottom voxels of a rectangular hull */ int numb_pl;/* the number of line segment in the current frame */ point_length pl[PLDIM];/* a structure for line segment */

}

The point_length is a structure which defines the position and the size of a line segment along the x-direction on the (x,y) plane and is given by the following: typedef struct{ int x;/* the address of the starting pixel of the line segment*/ int y;

unsigned char length;/* the size of the line segment*/

} point_length

In Frame_Volume, two boundary points of the polygon have been saved covering ROI voxels on the same frame. These two boundary points will be used to speed up the checking of ROI voxels if they are inside the polygon. Also, these two boundary voxels could be out-of-bound (e.g., a negative number) for a certain plane. Therefore, the data structure should be updated before the volume data is updated.

Figure 6:
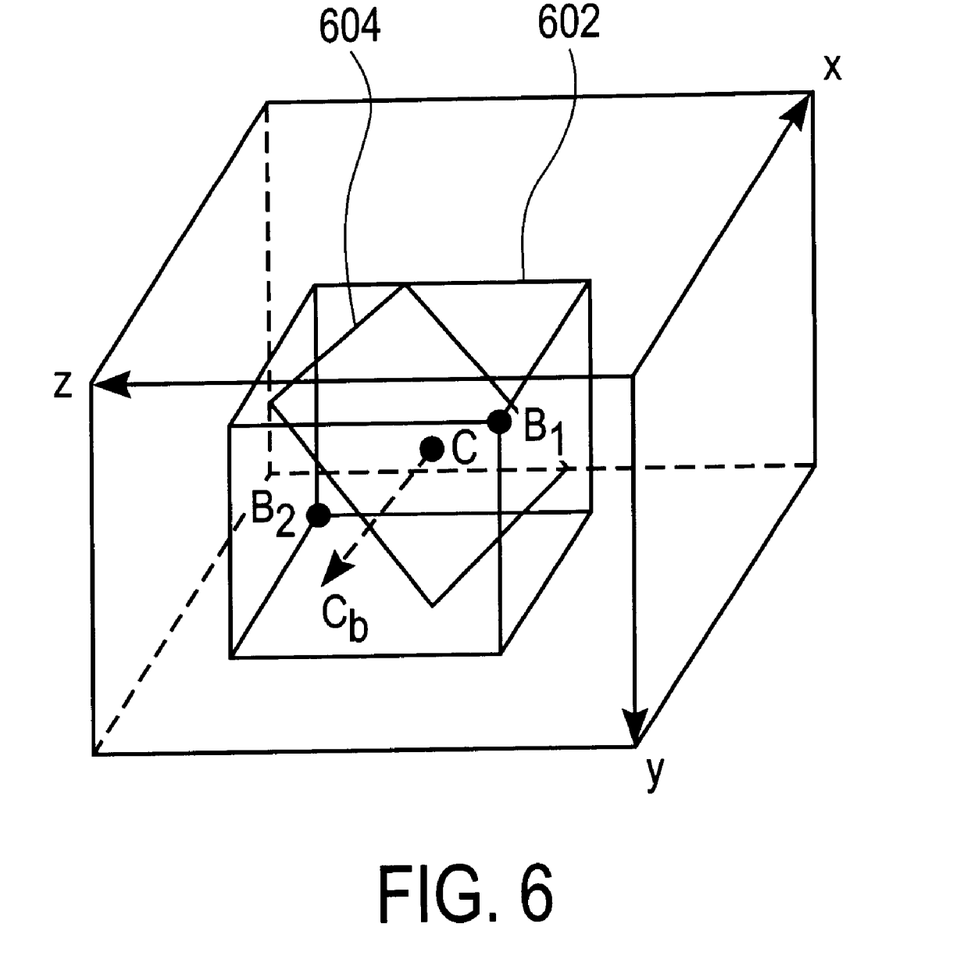
FIG. 6 illustrates a bounded box and propagation of slices.

In a preferred embodiment, the propagation of a slice could be bounded by a predefined rectangular box which is defined by two diagonal corners, $B_1=(x_s, y_s, z_s)$ and $B_2=(x_e, y_e, z_e)$. FIG. 6 illustrates a bounded box 602 and a propagation of slices 604 through the box. If parts of ROI (defined by a line segment with a starting pixel of $(x_o, y_o)$ and the length of l) are out-of-bound, Frame_Volume can be modified as follows: if $x_o<x_s$ compute $1'=1-x_s+x_o$ and the new length is defined as the minimum of $x_e-x_s$ and $1'$, and the new starting pixel of this line segment will be $(x_s, y_o)$. Note that if $1'$ is negative the whole line will be discarded. If $x_o$ is not less than $x_s$ but the line segment is still out-of-bound, compute $1'=x_e-x_o$ and define the new length as the minimum of 1 and $1'$. This modification is constrained within a valid region of $y_s<y_o<y_e$.

Figure 7:
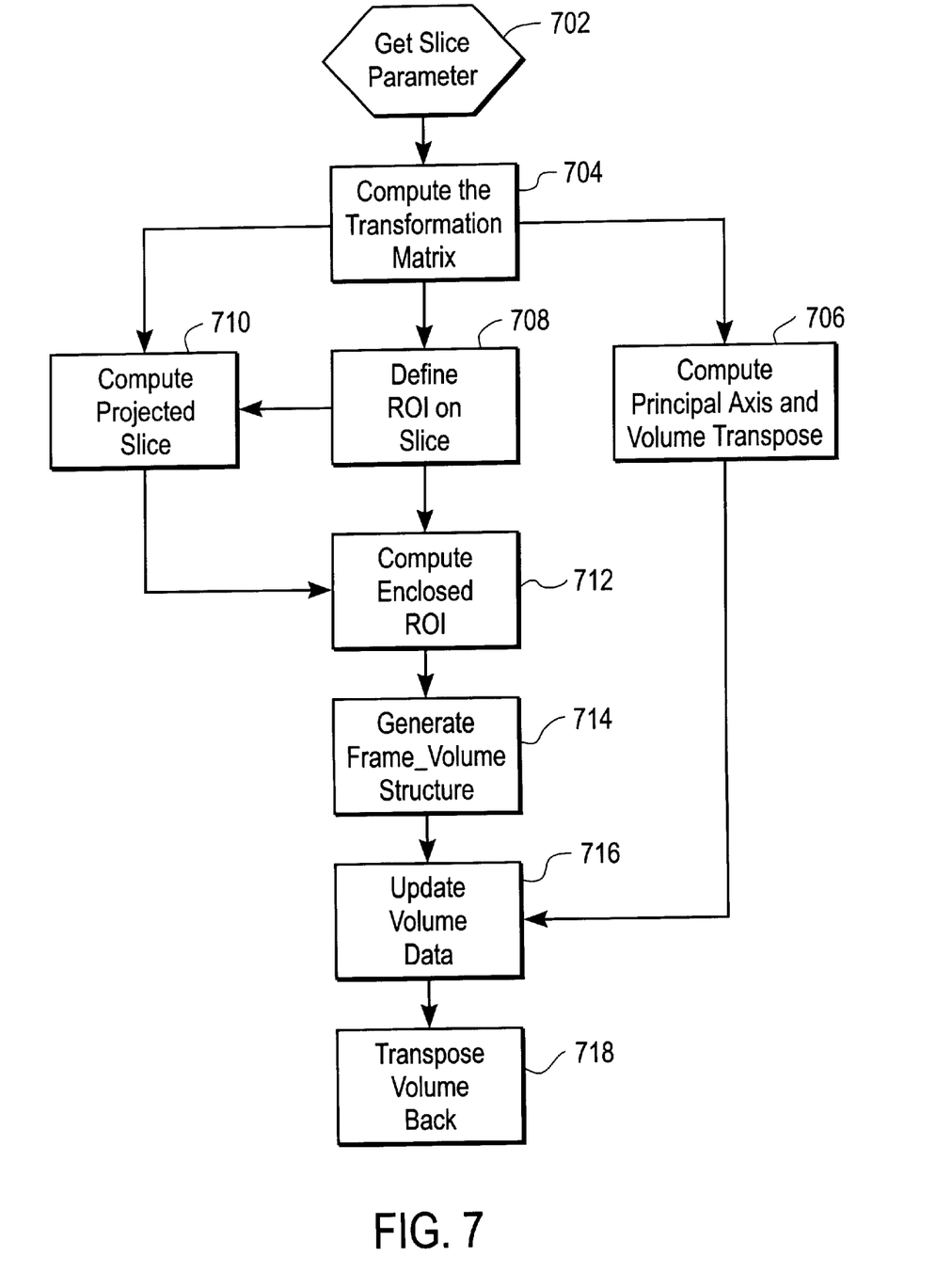
FIG. 7 illustrates an algorithm for the 3-D volume editing from arbitrary projected slices.

FIG. 7 illustrates an algorithm for the 3-D volume editing from arbitrary projected slices. The input and output are described below.

Input: parameters to define an arbitrary slice—the lateral and the axial direction vectors of the slice, and the origin of the slice Output: (1) a data structure in the normal (x, y, z) space to remove ROIs, and (2) an updated volume data.

First, the slice parameters are obtained, via step 702. From these parameters (i.e., given lateral and the axial direction vectors of the slice), the slice normal vector $(l_w, m_w, n_w)$ and its transformation matrix of the slice is computed, via step 704. This slice image will be displayed in a preferred embodiment by using a trilinear interpolation and a user can draw ROI as a set of polygon vertices on the slice image. The principal axis of slicing is determined and the volume data is transposed along the principal axis if it not along the z axis, via step 706. The ROI voxels on the initial (u, v) slice are transformed to the base voxels in the (x, y, z) space and the projection of the ROI volume is computed to the (x, y) plane, via steps 708 and 710. All of the enclosed ROIs are computed, via step 712 and the data structure, Frame_Volume is generated as a set of line segments which covers the enclosed ROIs, via step 714. The projected ROI regions are propagated and volume data along the z direction is updated by translating the line segments defined in Frame_Volume, via step 714. Finally, the volume data is transposed back to the original coordinates system, via step 716.

EDIT UNDO

In addition, in an improvement, a link list structure could be utilized to store the edits in memory such that edits could be undone in a limitless and straightforward manner (unlimited undo).

In this embodiment, the original volume is stored in memory untouched. To apply an edit, the user draws a shape (curve, box . . . ), that shape and the vector perpendicular to it is stored in memory in a linked list of edits. Each edit is applied sequentially to a copy of the volume above utilizing the data structure described above. When the user decides to undo an edit, the system makes a new copy of the original volume and applies the number of edits necessary following the linked list.

The feature has the following advantages: The edits can be undone in an unlimited manner.

Linked list memory requirement is fairly low and can be stored in a file. The user only needs to save one data set, the original one. Since all edits can be reapplied via the link list. Original data is always preserved.

The feature can be a facilitator for telemedicine. The volume can be sent to a high band width party (an administrator) and then a bookmark (a low bandwidth party) can be utilized to send the edit linked list.

Wedge Detection at Boundary Planes

A method in accordance with the present invention can remove the inside of an ROI volume and also delete a wedge-like part around the corner of the ROI volume because the moving projected planes are proportional to the slice planes which are along their normal direction. This situation may be fine for removing the inside of an ROI volume but will show as an artifact of undeleted wedge in the case of removing the outside of an ROI volume. This feature has clinical applications, for example, if one wants to remove the outside of kidney bounded by a rectangular box; if the boundary conditions are not taken into account, then an unwanted wedge will appear at two ends of the rectangular box. Therefore, a simple and efficient method to handle the boundary condition for any rotated volume is disclosed.

In a preferred embodiment, the boundary condition of the ROIs must also be determined to ensure accurate image editing. To describe this feature refer now to the following in conjunction with the accompanying Figures.

As before mentioned, in volume editing, the user can specify an arbitrary slice and draw more than one ROI to be removed. As above-mentioned ROI voxels are transformed on the initial (u, v) plane to (x, y, z) space, $$x_c=ul_u+vl_v+x_o, y_c=um_u+vm_v+y_o, z_c=un_u+vn_v+z_o \qquad \text{(Equation 5)}$$

where (x—is the origin of the slice). The next slice along the normal direction will be $$x_{k+1}=x_k+dl_w, y_{k+1}=y_k+dm_w, z_{k+1}=z_k+dn_w \qquad \text{Equation 6)}$$

where d represents the distance between the slice k and the slice k+1. Also, the projected plane at $z=z_p$ will be $$x_p=x_c+d_pl_w, y_p=y_c+d_pm_w \qquad \text{(Equation 7)}$$

and $d_p=(z_p-z_c)/n_w$.

It is clear that, from Equations (5) and (6), the new projected ROI voxels on z=z' will be $$x'=x+\Delta z\, l_w/n_w, y'=y+\Delta z\, m_w/n_w \qquad \text{(Equation 8)}$$

where $\Delta z=z'-z$ is the depth difference between the base frame and the new projection frame. From Equation (5), the new ROI voxels on the next plane are just the translation of the voxels on the previous plane.

Figure 8:
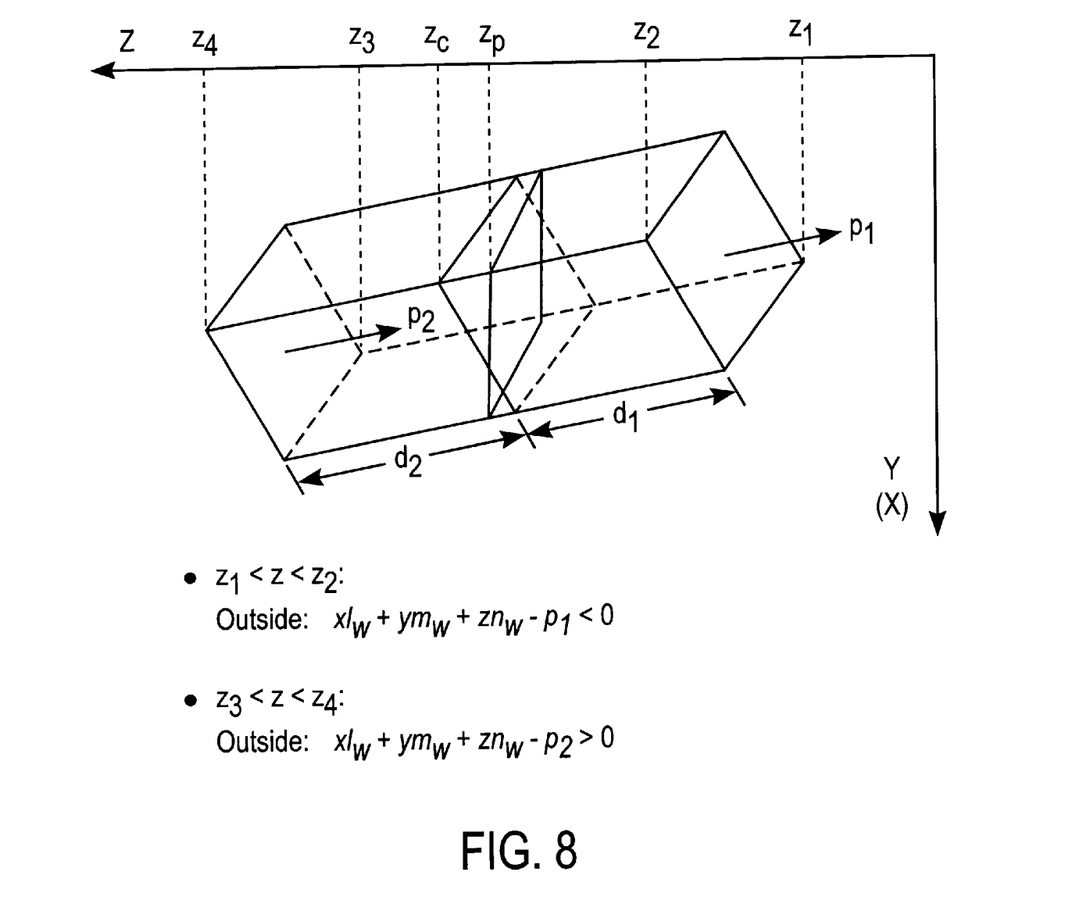
FIG. 8 shows determination of the z-coordinates of the right and left boundary planes of the ROI volume for given depths.

Similarly, the z-coordinates of the right and left boundary planes of the ROI volume will be:

$$z_r = z_c - d_1 n_w \text{ and } z_l = z_c + d_2 n_w$$

for given depths $d_1$ and $d_2$, as shown in FIG. 8. From four $z_r$'s computed from the corners of a rectangular box we can find the maximum and the minimum values such as $z_2$ and $z_1$ respectively. This is the range around the right boundary plane to handle the wedge process. Also, we can compute $z_3$ and $z_4$ for the left boundary plane.

Figure 9:
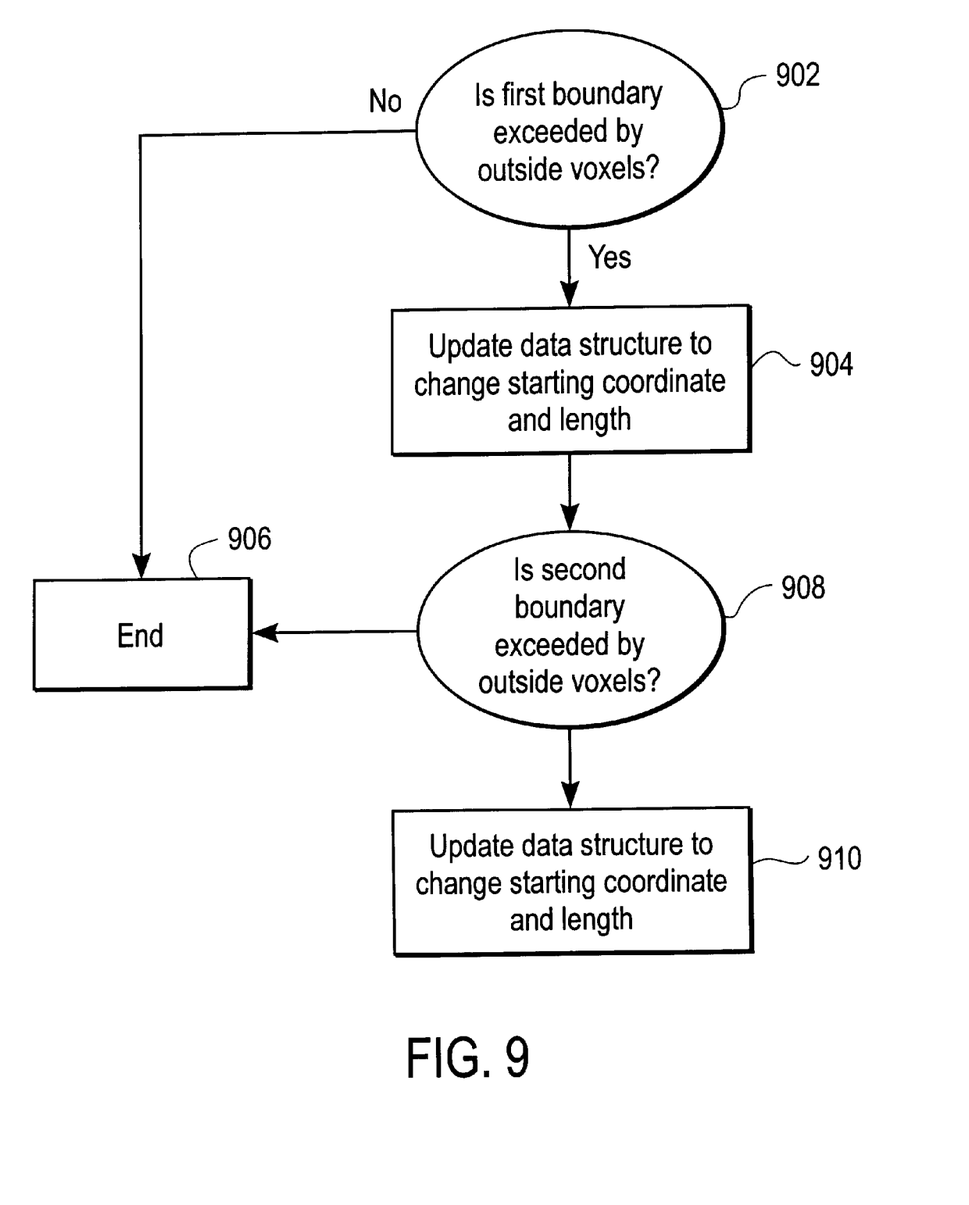
FIG. 9 is a flow chart illustrating the detection of wedges in accordance with the present invention.

Now, the processing of the wedge is straightforward. FIG. 9 is a flow chart illustrating the detection of wedges in accordance with the present invention. For the first condition, $z_1 < z < z_2$, the outside voxels at first boundary are detected by checking if $xl_w + ym_w + zn_w - p_1 < 0$ via step 902. If there are no pixels outside the boundary they end, via step 906. If there are voxels outside the boundary the data structure is updated to change the starting x-coordinate and its length, via step 904. Similarly, for $z_3 < z < z_4$, we can detect the outside voxels by checking if $xl_w + ym_w + zn_w - p_1 > 0$ and update the data structure frame by frame if appropriate, via steps 908 and 910.

This feature has clinical applications, for example, if one wants to remove the outside of kidney bounded by a rectangular box; if the boundary conditions are not taken into account, then an unwanted wedge will appear at two ends of the rectangular box.

In a preferred embodiment, a system and method in accordance with the present invention comprises a fast algorithm to process a set of compact ROI volumes to remove either the inside or the outside ROI volumes. Because the computational complexity is linear to the boundary of the ROI, a system and method in accordance with the present invention can allow 3D volume editing to be faster and more user interactive.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for three dimensional (3D) volume editing of at least one region of interest (ROI) for medical imaging applications, the method comprising the steps of:
    (a) projecting vertices of the at least one ROI in one plane;
    (b) transforming the data within the at least one ROI to allow all of a plurality of slices on the inside of the at least one ROI to be along one axis of a three axis coordinate system; and
    (c) representing the inside of the at least one ROI as a plurality of line segments, wherein only two coordinates and the length of a line segment are stored.

2. The method of claim 1 in which includes the transforming step (b) includes the step of (b1) connecting the vertices in a closed border within the at least one ROI.

3. The method of claim 1 which includes the steps of
    (d) determining if there is at least one wedge within the 3D volume; and
    (e) updating a starting voxel and its line length to remove the at least one wedge.

4. The method of claim 1 wherein a data structure represents the at least one ROI.

5. The method of claim 4 wherein the determining step (d) comprises the steps of:
    (d1) determining if there are any voxels outside at least one boundary; and
    (d2) updating the data structure if there are voxels outside the at least one boundary.

6. The method of claim 5 wherein the at least one boundary comprises first and second boundaries.

7. The method of claim 1 wherein the three axis coordinate system comprises the x, y and z axis.

8. The method of claim 7 wherein the one axis comprises the z axis.

9. The method of claim 8 wherein the x and y coordinates are stored.

10. The method of claim 1 wherein the original volume and a link list structure are stored such that volume edits can be undone in a substantially limitless fashion.

11. A system for three dimensional (3D) volume editing of at least one region of interest (ROI) for medical imaging applications, the system comprising:
    means for projecting vertices of the at least one ROI in one plane;
    means for transforming the data within the at least one ROI to allow all of a plurality of slices on the inside of the at least one ROI to be along one axis of a three axis coordinate system; and
    means for representing the inside of the at least one ROI as a plurality of line segments, wherein only two coordinates and the length of a line segment are stored.

12. The system of claim 11 in which the transforming means includes means for connecting the vertices in a closed border within the at least one ROI.

13. The system of claim 11 which includes the means:
    means for determining if there is at least one wedge within the 3D volume; and means for updating a starting voxel and its line length to remove the at least one wedge.

14. The system of claim 11 wherein a data structure represents the at least one ROI.

15. The system of claim 14 wherein the determining means comprises:
    means for determining if there are any voxels outside at least one boundary; and
    means for updating the data structure if there are voxels outside the at least one boundary.

16. The system of claim 15 wherein the at least one boundary comprises first and second boundaries.

17. The system of claim 11 wherein the three axis coordinate system comprises the x, y and z axis.

18. The system of claim 17 wherein the one axis comprises the z axis.

19. The system of claim 11 wherein the x and y coordinates are stored.

20. The method of claim 11 wherein the original volume and a link list structure are stored such that volume edits can be undone in a substantially limitless fashion.

21. A computer readable medium containing program instructions to be executed on a computer system for three dimensional (3D) volume editing of at least one region of interest (ROD) for medical imaging applications, the programming instructions for:

(a) projecting vertices of the at least one ROI in one plane;

(b) transforming the data within the at least one ROI to allow all of a plurality of slices on the inside of the at least one ROI to be along one axis of a three axis coordinate system; and (c) representing the inside of the at least one ROI as a plurality of line segments, wherein only two coordinates and the length of a line segment are stored.

22. The computer readable medium of claim 21 which includes programming instructions for (b1) connecting the vertices in a closed border within the at least one ROI.

23. The computer readable medium of claim 21 which includes program instructions for (d) determining if there is at least one wedge within the 3D volume; and (e) updating a starting voxel and its line length to remove the at least one wedge.

24. The computer readable medium of claim 21 wherein a data structure represents the at least one ROI.

25. The computer readable medium of claim 21 wherein the determining step (d) comprises the steps of:

(d1) determining if there are any voxels outside at least one boundary; and (d2) updating the data structure if there are voxels outside the at least one boundary.

26. The computer readable medium of claim 25 wherein the at least one boundary comprises first and second boundaries.

27. The computer readable medium of claim 26 wherein the three axis coordinate system comprises the x, y and z axis.

28. The computer readable medium of claim 27 wherein the one axis comprises the z axis.

29. The computer readable medium of claim 28 wherein the x and y coordinates are stored.

30. The method of claim 21 wherein the original volume and a link list structure are stored that volume edits can be undone in a substantially limitless fashion.

* * * * *